Nov. 20, 1928.

A. L. WASHBURNE 1,692,066

WATER COOLER

Filed Oct. 21, 1926

INVENTOR
ARTHUR L. WASHBURNE
BY Munn & Co.
ATTORNEY

Patented Nov. 20, 1928.

1,692,066

UNITED STATES PATENT OFFICE.

ARTHUR L. WASHBURNE, OF LOS ANGELES, CALIFORNIA.

WATER COOLER.

Application filed October 21, 1926. Serial No. 143,220.

My invention relates generally to water coolers, and particularly, although not necessarily, to water coolers of the type employing an olla upon which a bottle of water is supported in inverted position to deliver its water to the olla for dispensing from the olla through the usual faucet.

It is a purpose of my invention to provide simple and effective means by which the olla and bottle are sealed against air entering either receptacle except in a manner to be filtered of its impurities and thereby prevent contamination of the water.

It is also a purpose of my invention to provide a ring interposed between the bottle and olla for sealing the joint between the two to prevent influx of contaminated air into either receptacle at this point.

A further purpose of my invention is the provision of an air filter which is associated with the sealing ring or the olla in a manner to filter that air taken into the cooler of all impurities, the filter being constructed to permit the ready substitution, when necessary, of new filtering elements.

I will describe only two forms of water cooler embodying my invention and will then point out the novel features thereof in claims.

In the accompanying drawings.

Similar reference characters refer to similar parts in each of the views.

Figure 1:
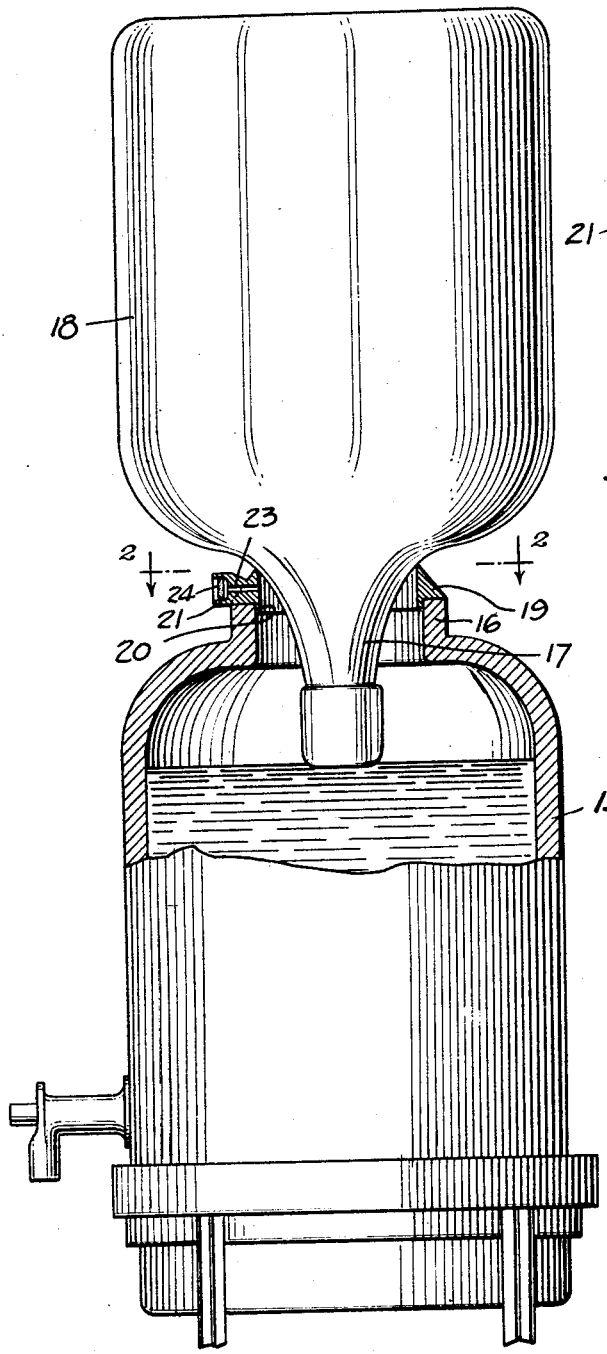
Figure 1 is a view showing in side elevation and partly in section one form of water cooler embodying my invention.

In Figure 1, 15 designates a conventional form of olla having a neck 16 for the reception of the neck 17 of a bottle 18. Interposed between the necks 16 and 17 is a sealing ring 19 comprising, in the present instance, an annular body of resilient material, such as rubber or the like, and which is of substantially triangular formation in cross section to provide a relatively broad base which is seated on the upper edge of the neck 16 and a relatively narrow upper part which is adapted to have contact with the neck of the bottle. The inner edge of the base is provided with a depending annular flange 20 designed to engage the inner wall of the neck 16 and to thus center the ring on the neck and lock the ring against accidental lateral displacement.

With the bottle neck 17 in applied position, as shown in Figure 1, the weight of the bottle and any water contained therein functions to flex the upper edge of the ring in a manner to produce an air-tight seal between the ring and the bottle neck, so that the passage of air inwardly to the olla or bottle at the joint between the necks of the two is prevented.

Figure 2:
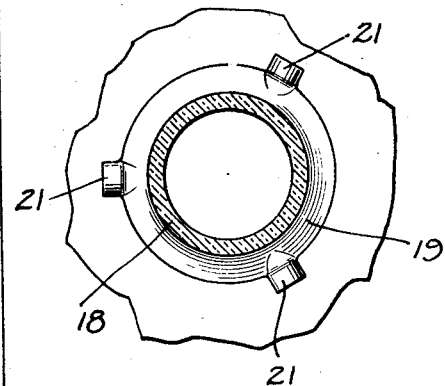
Figure 2 is a horizontal sectional view taken on the line 2—2 of Figure 1.
Figure 3:
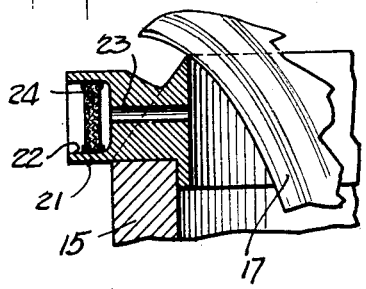
Figure 3 is an enlarged fragmentary vertical sectional view of the sealing ring and one of the air filtering devices embodied in the cooler shown in Figure 1.

As illustrated to advantage in Figure 2, the sealing ring 19 is provided at circumferentially spaced intervals with radial enlargements 21, each enlargement, as shown in Figure 3, being formed with a cup-shaped pocket 22 communicating at its inner end with an air port 23 which extends through to the inner periphery of the ring in order to supply air interiorly of the olla. Within the pocket 22 is a filtering element 24 of any suitable material to allow the free passage of air therethrough but to filter the air of all impurities, so that the air finally delivered to the olla is free of impurities.

In practice, the sealing ring 19 in its sealing function at the joint between the necks of the olla and bottle confines the influx of air to the olla to the ports 23, and because of the correlation of the filtering elements 24 with respect to such ports, it will be manifest that all air admitted to the olla and bottle is free of impurities, thereby preventing the contamination of the water. In water coolers of this type heretofore proposed, no air sealing means has been provided between the olla and bottle, and intentionally so, in order to permit the free influx of impure air into the olla and subsequently into the bottle, so that the water both in the bottle and olla is contaminated by the impure air, thus rendering the water impure. As my invention prevents the passage of impure air into either receptacle, it will be clear that the water is not contaminated by the impure air.

Figure 4:
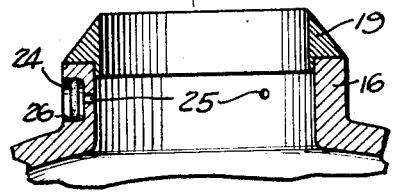
Figure 4 is a fragmentary sectional view of another form of water cooler embodying my invention.

In Figure 4 I have shown another form of water cooler embodying my invention in which the olla neck 16 is provided with one or more air ports 25 and cupped recesses 26 communicating with the ports and containing air filtering elements 24. In this adaptation of my invention, the sealing ring 19 is devoid of air ports and filtering elements, and by the provision of the air ports 25 it will be manifest that pure air is supplied to the olla through such ports and independently of the sealing ring.

Although I have herein shown and described only two forms of water cooler embodying my invention, it is to be understood that various changes and modifications may be made therein without departing from the spirit of the invention and the spirit and scope of the appended claims.

I claim as my invention:

1. A water cooler comprising an olla and a bottle supported on the olla, a sealing ring for sealing the joint between the two against the admission of air, a port in the ring, and means for filtering air passing inwardly of the port.

2. A sealing ring for water coolers comprising an annular body having air ports therein, and air filtering means for the ports.

3. A sealing ring for water coolers comprising an annular body having circumferentially spaced enlargements formed with air ports, and air filtering means correlated with each of the ports.

4. A water cooler comprising an olla and a bottle supported on the olla, a sealing ring between the two comprising an annular body having a relatively broad base seated on the neck of the olla and a relatively narrow upper part on which the neck of the bottle is seated, said body being formed of resilient material to permit flexing of the upper part of the ring, circumferentially spaced enlargements on the ring having air ports and pockets communicating with the air ports, and air filtering elements in the pockets.

5. A sealing ring for water coolers, comprising an annular body having a relatively broad base adapted to be seated on the neck of an olla and a relatively narrow upper part on which the neck of a bottle is adapted to seat, said body formed of resilient material so that said upper part will flex in response to the weight of a bottle resting thereon, the ring having an air duct and pocket communicating with the port, and an air filtering element in the pocket.

6. A sealing ring for water coolers, comprising an annular body having a relatively broad base adapted to be seated on the neck of an olla and a relatively narrow upper part on which the neck of a bottle is adapted to seat, said body formed of resilient material so that said upper part will flex in response to the weight of a bottle resting thereon, the ring having an air duct communicating with its inner periphery, an enlargement on the ring having a pocket therein communicating with the duct, and an air filtering element in the pocket.

7. A sealing ring for water coolers comprising an annular body of resilient material having a relatively broad, flat base adapted to seat upon the neck of an olla, the base having an annular flange at the inner periphery of the body adapted to be received within the neck of the olla to prevent lateral displacement of the ring therefrom, the inner periphery of the body being substantially at right angles to its diameter, and the outer periphery of the body tapering from the outer edge of the base to the inner periphery of the body so as to provide a relatively narrow annular portion upon which the neck of a bottle is adapted to rest, said annular portion capable of flexing outwardly under the weight of the bottle to conform to irregularities in the surface of the latter and thereby provide an air-tight seal between the ring and bottle.

8. A sealing ring as embodied in claim 7 wherein the annular body is provided with an air duct, an enlargement on the body having a pocket therein communicating with the duct, and an air filtering element in the pocket.

9. A sealing ring for water coolers comprising an annular body having a relatively broad base adapted to be seated on the neck of an olla and a relatively narrow upper part on which the neck of a bottle extended into the body is adapted to seat to support the bottle in an inverted position on the olla, said body being formed of yieldable material so that its said upper part will yield in response to the weight of the bottle resting thereon and thereby conform to the contour of the bottle and seal the joint between the body and bottle against the passage of air.

10. A sealing ring for water coolers comprising an annular body having a relatively broad base adapted to be seated on the neck of an olla and a relatively narrow upper part on which the neck of a bottle extended into the body is adapted to seat to support the bottle in an inverted position on the olla, said body being formed of yieldable material so that its said upper part will yield in response to the weight of the bottle resting thereon and thereby conform to the contour of the bottle and seal the joint between the body and bottle against the passage of air, the body having means for admitting air therethrough, and means for filtering the air.

ARTHUR L. WASHBURNE.